US009572185B2

(12) United States Patent
Sivanesan et al.

(10) Patent No.: US 9,572,185 B2
(45) Date of Patent: Feb. 14, 2017

(54) BEARER SPLIT RATIOS FOR DUAL CONNECTIVITY SYSTEMS

(71) Applicant: INTEL IP CORPORATION, Santa Clara, CA (US)

(72) Inventors: Kathiravetpillai Sivanesan, Richardson, TX (US); Ali Koc, Portland, OR (US); Rath Vannithamby, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 126 days.

(21) Appl. No.: 14/496,152

(22) Filed: Sep. 25, 2014

(65) Prior Publication Data
US 2015/0085800 A1 Mar. 26, 2015

Related U.S. Application Data

(60) Provisional application No. 61/883,127, filed on Sep. 26, 2013.

(51) Int. Cl.
*H04W 76/02* (2009.01)
*H04W 76/06* (2009.01)
(Continued)

(52) U.S. Cl.
CPC .......... *H04W 76/023* (2013.01); *H04L 1/12* (2013.01); *H04L 5/0037* (2013.01);
(Continued)

(58) Field of Classification Search
None
See application file for complete search history.

(56) References Cited

U.S. PATENT DOCUMENTS 6,335,933 B1 * 1/2002 Mallory ............... H04L 1/1635
370/394
6,975,604 B1 * 12/2005 Ishida .................. H04L 1/0002
370/331

(Continued)

FOREIGN PATENT DOCUMENTS

WO WO 2011/100673 A1 8/2011
WO WO 2012/166975 A1 12/2012

OTHER PUBLICATIONS

3GPP TR 36.842 V0.2.0, '3GPP; TSGRAN: E-UTRA: Study on Small Cell Enhancements for E-UTRA and E-UTRAN-Higher layer aspects (Release 12)', Jun. 7, 2013.

(Continued)

*Primary Examiner* — Steven H Nguyen
(74) *Attorney, Agent, or Firm* — Thorpe North & Western

(57) ABSTRACT

Technology for communicating data to a user equipment (UE) is disclosed. Effective data rates may be identified, at a master evolved node B (MeNB), for the UE with respect to the MeNB and a secondary evolved node B (SeNB). A downlink split ratio for bearers of the MeNB and the SeNB to the UE may be determined based in part on the effective data rates for the UE. A first portion of data may be sent from the MeNB to the UE according to the downlink split ratio. A remaining portion of data may be sent from the MeNB to the UE via the SeNB according to the downlink split ratio, wherein the UE supports dual connectivity with the MeNB and the SeNB.

27 Claims, 11 Drawing Sheets

(51) Int. Cl.

| | | |
|---|---|---|
| *H04W 24/04* | (2009.01) | |
| *H04L 5/00* | (2006.01) | |
| *H04W 40/22* | (2009.01) | |
| *H04W 52/02* | (2009.01) | |
| *H04L 12/801* | (2013.01) | |
| *H04W 72/04* | (2009.01) | |
| *H04W 48/16* | (2009.01) | |
| *H04W 40/24* | (2009.01) | |
| *H04W 88/08* | (2009.01) | |
| *H04W 36/32* | (2009.01) | |
| *H04L 29/08* | (2006.01) | |
| *H04L 1/12* | (2006.01) | |
| *H04L 12/803* | (2013.01) | |
| *H04W 84/12* | (2009.01) | |
| *H04W 92/20* | (2009.01) | |

(52) U.S. Cl.
CPC .......... *H04L 5/0048* (2013.01); *H04L 5/0055* (2013.01); *H04L 47/12* (2013.01); *H04L 47/122* (2013.01); *H04L 67/025* (2013.01); *H04L 67/104* (2013.01); *H04W 24/04* (2013.01); *H04W 36/32* (2013.01); *H04W 40/22* (2013.01); *H04W 40/24* (2013.01); *H04W 48/16* (2013.01); *H04W 52/0274* (2013.01); *H04W 72/0446* (2013.01); *H04W 72/0453* (2013.01); *H04W 76/068* (2013.01); *H04W 88/08* (2013.01); *H04W 84/12* (2013.01); *H04W 92/20* (2013.01)

(56) References Cited

U.S. PATENT DOCUMENTS

| | | | | |
|---|---|---|---|---|
| 7,197,019 B2* | 3/2007 | Menzel | H04W 36/12 | 370/331 |
| 7,251,246 B2* | 7/2007 | Ross | H04L 49/90 | 370/394 |
| 7,349,400 B2* | 3/2008 | Khirman | H04L 29/06 | 370/230 |
| 7,403,528 B2* | 7/2008 | Hu | H04L 1/1838 | 370/328 |
| 7,436,795 B2* | 10/2008 | Jiang | H04L 1/1841 | 370/235 |
| 7,782,862 B2* | 8/2010 | Mooney | H04L 47/10 | 370/394 |
| 7,826,855 B2* | 11/2010 | Chun | H04L 1/1635 | 455/455 |
| 8,199,758 B2* | 6/2012 | Patwardhan | H04L 1/1848 | 370/394 |
| 8,451,795 B2* | 5/2013 | Ho | H04L 1/1874 | 370/331 |
| 8,498,666 B2* | 7/2013 | Sebire | H04L 5/001 | 370/351 |
| 8,588,793 B2* | 11/2013 | Tomici | H04W 76/025 | 370/331 |
| 8,638,723 B2* | 1/2014 | Cave | H04L 1/1841 | 370/328 |
| 8,638,773 B2* | 1/2014 | Ho | H04L 1/1825 | 370/349 |
| 9,226,092 B2* | 12/2015 | Moshfeghi | H04W 84/00 | |
| 2004/0063455 A1* | 4/2004 | Eran | H04J 13/0048 | 455/525 |
| 2005/0169209 A1* | 8/2005 | Miu | H04W 28/08 | 370/328 |
| 2005/0281232 A1* | 12/2005 | Kim | H04L 1/1887 | 370/335 |
| 2007/0153729 A1* | 7/2007 | Alapuranen | H04B 7/12 | 370/329 |
| 2007/0286126 A1* | 12/2007 | Prakash | H04W 28/06 | 370/331 |
| 2008/0056171 A1* | 3/2008 | Khayrallah | H04L 1/1812 | 370/314 |
| 2008/0069043 A1* | 3/2008 | Kimura | H04W 40/12 | 370/329 |
| 2008/0144572 A1* | 6/2008 | Makhijani | H04L 1/1887 | 370/330 |
| 2008/0159428 A1* | 7/2008 | Shinozaki | H04L 5/006 | 375/260 |
| 2008/0192682 A1* | 8/2008 | Matsumoto | H04B 7/0413 | 370/328 |
| 2009/0052397 A1* | 2/2009 | Meylan | H04L 1/1841 | 370/331 |
| 2009/0103478 A1* | 4/2009 | Sammour | H04L 1/1874 | 370/328 |
| 2009/0168724 A1* | 7/2009 | Umesh | H04W 36/02 | 370/331 |
| 2009/0185535 A1* | 7/2009 | Lee | H04W 36/02 | 370/331 |
| 2009/0253433 A1* | 10/2009 | Voyer | H04L 45/24 | 455/436 |
| 2009/0258628 A1* | 10/2009 | Lindoff | H04L 27/0014 | 455/302 |
| 2010/0003990 A1* | 1/2010 | Suemitsu | H04W 72/02 | 455/442 |
| 2010/0215006 A1* | 8/2010 | Ho | H04L 1/1825 | 370/329 |
| 2010/0222063 A1* | 9/2010 | Ishikura | H04L 27/2647 | 455/450 |
| 2011/0040888 A1* | 2/2011 | Krishnaswamy | H04L 63/0884 | 709/231 |
| 2011/0141936 A1* | 6/2011 | Utagawa | H04L 65/608 | 370/252 |
| 2011/0275359 A1* | 11/2011 | Sebire | H04L 5/001 | 455/422.1 |
| 2011/0292894 A1* | 12/2011 | Wu | H04L 1/1812 | 370/329 |
| 2011/0296006 A1* | 12/2011 | Krishnaswamy | H04L 29/12952 | 709/224 |
| 2011/0305220 A1* | 12/2011 | Lindoff | H04W 28/26 | 370/331 |
| 2012/0002632 A1 | 1/2012 | Takagi | | |
| 2012/0231784 A1* | 9/2012 | Kazmi | H04B 1/3838 | 455/423 |
| 2012/0281564 A1* | 11/2012 | Zhang | H04L 1/08 | 370/252 |
| 2013/0150119 A1* | 6/2013 | Yoon | H04W 88/10 | 455/552.1 |
| 2013/0176988 A1* | 7/2013 | Wang | H04W 28/08 | 370/331 |
| 2013/0215772 A1* | 8/2013 | Kaur | H04W 36/0072 | 370/252 |
| 2013/0250910 A1* | 9/2013 | Liao | H04W 36/08 | 370/331 |
| 2014/0023015 A1* | 1/2014 | Frederiksen | H04L 5/001 | 370/329 |
| 2014/0112282 A1* | 4/2014 | Wijting | H04L 5/001 | 370/329 |
| 2014/0153489 A1* | 6/2014 | Perras | H04W 60/00 | 370/328 |
| 2014/0153504 A1* | 6/2014 | Wang | H04W 28/14 | 370/329 |
| 2015/0016367 A1* | 1/2015 | Koskinen | H04L 5/001 | 370/329 |
| 2015/0043336 A1* | 2/2015 | Zhu | H04W 28/0268 | 370/230 |

OTHER PUBLICATIONS

Interdigital Communications, 'Dual Connectivity for Small Cell Deployments', R2-131328, 3GPP TSG-RAN WG2 #81, Chicago, USA, Apr. 15-19, 2013.

\* cited by examiner

BEARER SPLIT RATIOS FOR DUAL CONNECTIVITY SYSTEMS

RELATED APPLICATIONS

The present application claims priority to U.S. Provisional Patent Application No. 61/883,127, filed Sep. 26, 2013, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
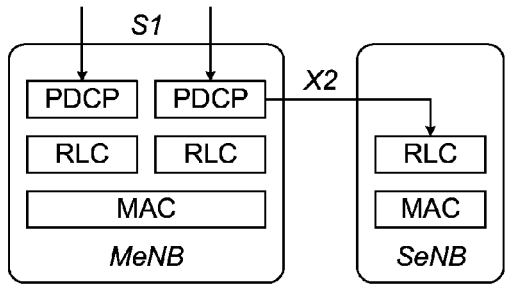
FIGS. 1A-1E illustrate dual connectivity architectures in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In 3GPP LTE Release 12.0, user equipments (UEs) may connect to more than one cell site simultaneously in a dual connectivity system. For example, the UE may connect to a master evolved node B (MeNB) and at least one secondary evolved node B (SeNB) simultaneously. When the UE connects to two cells, the UE may receive data bearers from both cells at substantially the same time. Dual connectivity may improve cell edge throughput, average sector throughput, and load balance between cells. The multiple bearers may be sent to the UE based on a location of an S1-U termination and location of the bearer split. In one example, the S1-U may be terminated at the MeNB and the bearer split may be performed at a packet data convergence protocol (PDCP) layer in the MeNB.

FIG. 1A illustrates an example of a dual connectivity architecture for a master evolved node B (MeNB) and a secondary evolved node B (SeNB). The S1-U may be terminated at the MeNB and the bearer split may occur at the MeNB. In addition, independent radio link controls (RLCs) may be present in the MeNB and the SeNB for the split bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The PDCP layer in the MeNB may receive data and/or control information from higher layers (e.g., IP layer or application layer). In one example, the data or control information may be communicated from the PDCP layer in the MeNB to the RLC and MAC layers in the MeNB. In addition, the data or control information may be communicated, from the PDCP layer in the MeNB, to the RLC layer in the SeNB via an X2 interface.

Figure 1B:
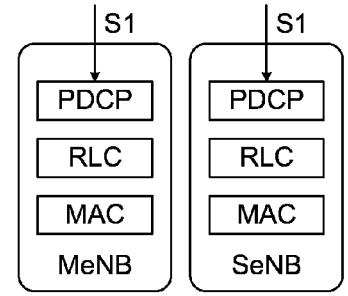

FIG. 1B illustrates another example of a dual connectivity architecture for a master evolved node B (MeNB) and a secondary evolved node B (SeNB). The S1-U may be terminated at the SeNB, and both the SeNB and the MeNB may include independent packet data convergence protocols (PDCPs), i.e., no bearer split. The MeNB and the SeNB may be connected to an Evolved Packet Core (EPC) via an S1 interface. For example, the MeNB and the SeNB may be connected to a serving gateway (S-GW) or mobility management entity (MME) via the S1 interface. The MeNB may include a PDCP layer, a radio link control (RLC) layer and a media access channel (MAC) layer. In addition, the SeNB may include a separate PDCP layer, RLC layer and MAC layer. The PDCP layer in the MeNB may receive data or control information from higher layers, and the PDCP layer in the SeNB may receive data or control information from higher layers.

Figure 1C:
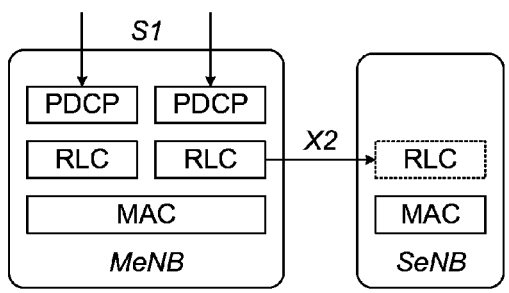

FIG. 1C illustrates yet another example of a dual connectivity architecture for a master evolved node B (MeNB) and a secondary evolved node B (SeNB). The S1-U may be terminated at the MeNB and the bearer split may occur at the MeNB. In addition, master-slave radio link controls (RLCs) may be present in the MeNB and the SeNB for the split bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The PDCP layer in the MeNB may receive data and/or control information from higher layers (e.g., IP layer or application layer). In one example, the data or control information may be communicated from the PDCP layer in the MeNB to the RLC and MAC layers in the MeNB. In addition, the data or control information may be communicated, from the RLC layer in the MeNB, to the RLC layer in the SeNB via an X2 interface.

Figure 1D:
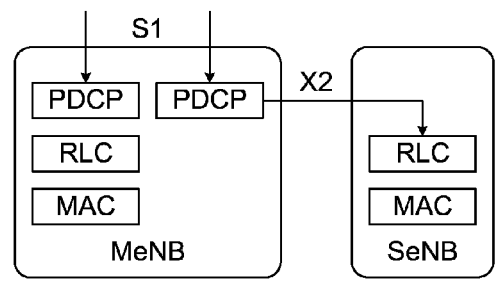

FIG. 1D illustrates yet another example of a dual connectivity architecture for a master evolved node B (MeNB) and a secondary evolved node B (SeNB). The S1-U may be terminated at the MeNB and no bearer split may occur at the MeNB. In addition, an independent radio link control (RLC) may be present at the SeNB. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The PDCP layer in the MeNB may receive data and/or control information from higher layers. In one example, the data or control information may be communicated from the PDCP layer in the MeNB to the RLC and MAC layers in the MeNB. In addition, the data or control information may be communicated, from the PDCP layer in the MeNB, to the RLC layer in the SeNB via an X2 interface.

Figure 1E:
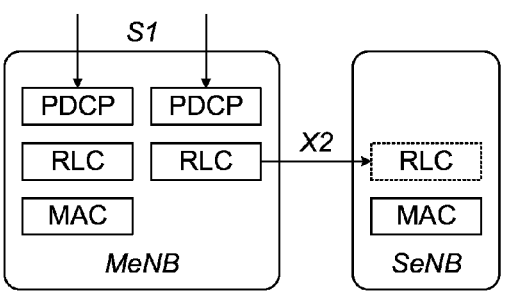

FIG. 1E illustrates yet another example of a dual connectivity architecture for a master evolved node B (MeNB) and a secondary evolved node B (SeNB). The S1-U may be terminated at the MeNB and no bearer split may occur at the MeNB. In addition, a master-slave radio link control (RLC) may be present for the SeNB bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The PDCP layer in the MeNB may receive data and/or control information from higher layers (e.g., IP layer or application layer). In one example, the data or control information may be communicated from the PDCP layer in the MeNB to the RLC and MAC layers in the MeNB. In addition, the data or control information may be communicated, from the RLC layer in the MeNB, to the RLC layer in the SeNB via an X2 interface.

The dual connectivity architectures described in FIGS. 1A-1E are further discussed in 3GPP Technical Review (TR) 36.842 Version 12.0.0.

Figure 1F:
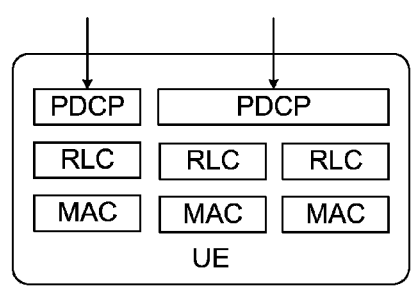
FIG. 1F illustrates an architecture of a user equipment (UE) operable to support dual connectivity in accordance with an example.

FIG. 1F illustrates exemplary architecture of a user equipment (UE). The UE may be configured to communicate with a master evolved node B (MeNB) and a secondary evolved node B (SeNB) in a dual connectivity architecture. The UE may include a PDCP layer, a RLC layer and a MAC layer. The PDCP layer in the UE may receive data and/or control information from the MeNB. In addition, the PDCP layer in the UE may receive data and/or control information from the SeNB. In one example, the data or control information may be communicated from the PDCP layer in the UE to lower layers in the UE (e.g., the RLC and MAC layers).

In one example, MAC schedulers in the MeNB and the SeNB may be responsible for scheduling the downlink (DL) and uplink (UL) traffic for the UEs. The MAC schedulers may calculate priority and effective data rates for each UE depending on link conditions, buffer status information and/or a type of traffic. In other words, the MACs schedulers may be responsible for splitting IP traffic received at the PDCP layer in the MeNB. In the downlink, the IP traffic may be split between paths to the UE via the MeNB and/or the SeNB. The IP traffic may be split based on the effective data rates for the UE. As a non-limiting example, in the downlink, the UE may receive 40% of the IP traffic directly from the MeNB and 60% of the IP traffic from the MeNB via the SeNB. In one example, the MAC schedulers in the MeNB and the SeNB may coordinate to improve network capacity and latency. In addition, the UE may receive signaling from the MeNB that indicates uplink splitting information (i.e., an uplink split ratio). In other words, the uplink split ratio may define a percentage of traffic to be transmitted to the MeNB from the UE and a percentage of traffic to be transmitted to the SeNB from the UE.

Figure 2:
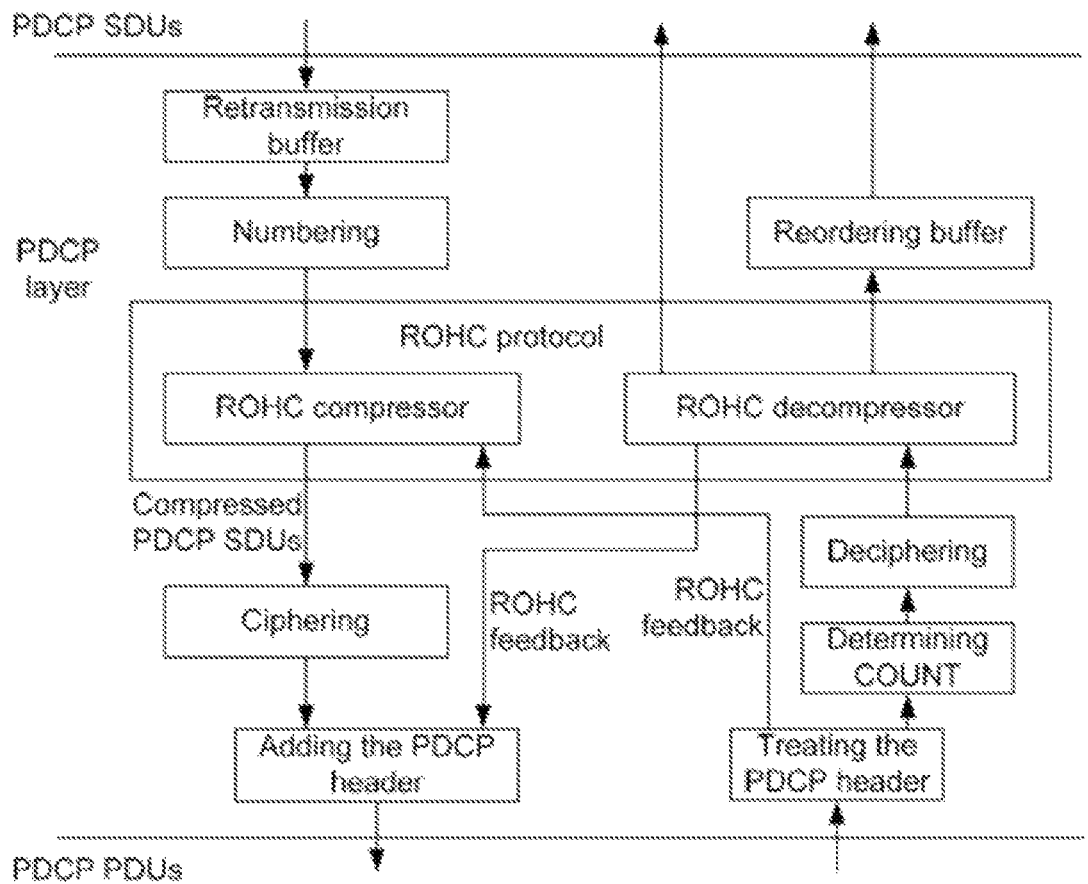
FIG. 2 illustrates a legacy user plane packet data convergence protocol (PDCP) layer in accordance with an example.

FIG. 2 illustrates a legacy user plane packet data convergence protocol (PDCP) layer. In one example, the PDCP layer may be in a master evolved node B (MeNB). In the downlink, the PDCP layer in the MeNB may receive PDCP service data units (SDUs) from higher layers (e.g., the IP layer or application layer). The PDCP SDUs may be stored in a retransmission buffer at the PDCP layer in the MeNB. A numbering function may be applied to the PDCP SDUs. The PDCP layer may perform header compression using the RObust Header Compression (ROHC) protocol defined by the IETF (Internet Engineering Task Force), which can result in compressed PDCP SDUs. Ciphering may be applied to the compressed PDCP SDUs and a PDCP header can be added. In addition, the PDCP SDUs may be converted to PDCP packet data units (PDUs). The PDCP PDUs may be communicated in the downlink, for example, to the UE.

In the uplink, the PDCP layer in the MeNB may receive PDCP PDUs from the UE (either directly from the UE or via the SeNB). The PDCP headers in the PDCP PDUs may be treated and a COUNT may be determined. A PDCP PDU counter (known as COUNT) may be used as input to the security algorithms. The COUNT value is incremented for each PDCP PDU during a radio resource control (RRC) connection. The COUNT has a length of 32 bits in order to allow an acceptable duration for the RRC connection. During the RRC connection, the COUNT value is maintained at the MeNB by counting each received PDCP PDU. Deciphering may be applied to the PDCP PDUs. The PDCP layer may perform header decompression and store the PDCP PDUs in a reordering buffer. In addition, the PDCP PDUs may be converted to PDCP SDUs. The PDCP SDUs may be communicated in the uplink from the PDCP layer in the MeNB to higher layers in the MeNB (e.g., IP layer or application layer). In other words, the PDCP SDUs may be arranged in a correct order before the PDCP PDUs are sent to the IP layer.

Figure 3A:
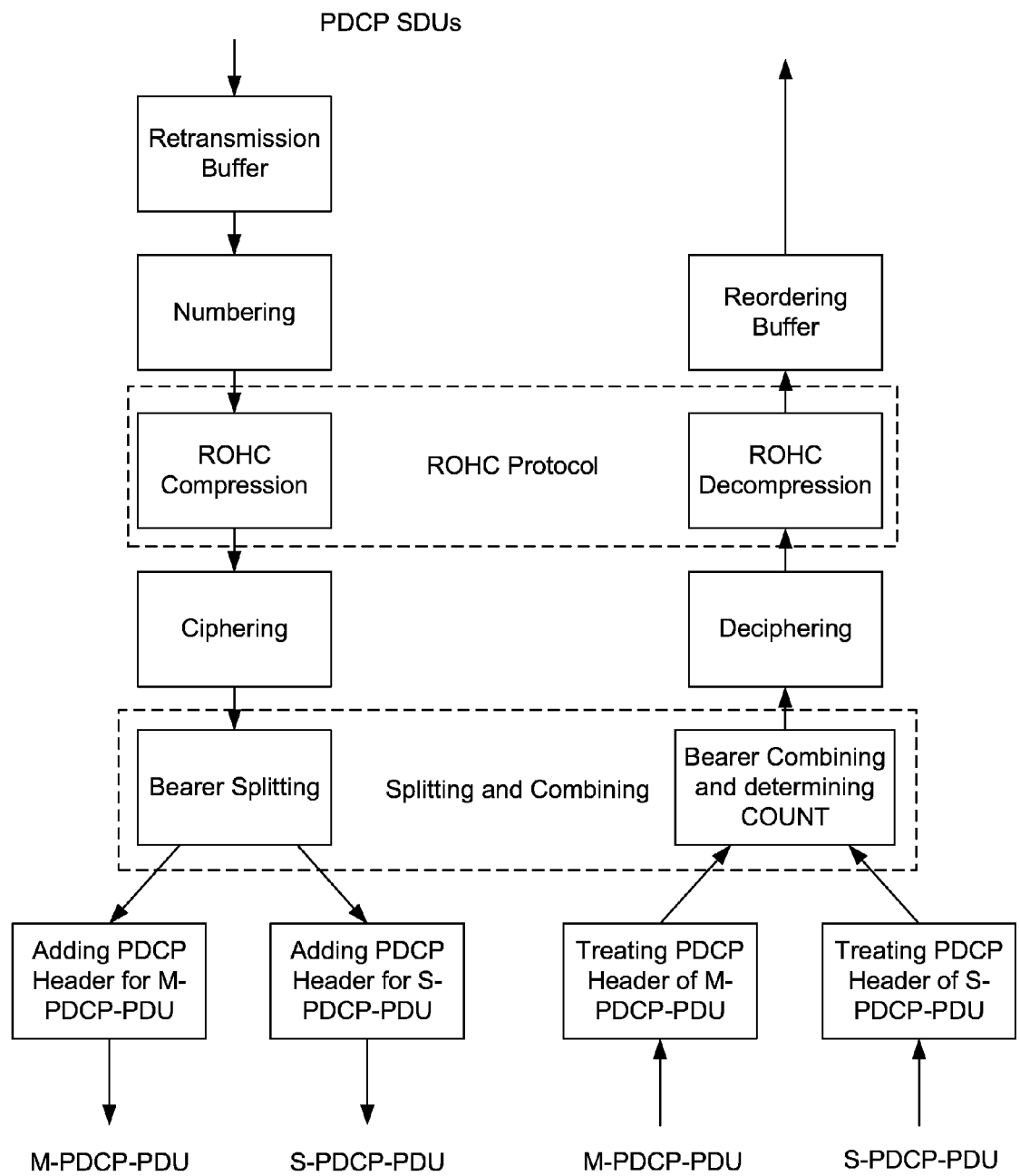
FIG. 3A illustrates a packet data convergence protocol (PDCP) layer in a master evolved node B (MeNB) in accordance with an example.

FIG. 3A illustrates a novel user plane packet data convergence protocol (PDCP) layer in a master evolved node B (MeNB). In the downlink, PDCP SDUs may be received at the retransmission buffer from higher layers in the MeNB. A numbering function may be applied to the PDCP SDUs. The PDCP layer may perform header compression using a ROHC protocol, which can result in compressed PDCP SDUs. Ciphering may be applied to the compressed PDCP SDUs. In addition, the PDCP SDUs may be converted to PDCP PDUs. A bearer split may occur after the ciphering is performed. In other words, the bearer split may refer to an ability to split a bearer over multiple eNBs in dual connectivity. The bearer split may be performed based on a downlink split ratio. The steps performed for calculating the downlink split ratio are described in further detail below. Based on the downlink split ratio, a first portion of the PDCP PDUs may become M-PDCP PDUs and a second portion of the PDCP PDUs may become S-PDCP PDUs. A first PDCP header may be added to the M-PDCP PDUs and a second PDCP header may be added to the S-PDCP PDUs. The MeNB may communicate the M-PDCP PDUs to the UE via a MeNB radio link. In addition, the MeNB may communicate the S-PDCP PDUs to the SeNB via an X2 interface, wherein the SeNB may communicate the S-PDCP PDUs to the UE via a SeNB radio link.

In the uplink, the PDCP layer in the MeNB may receive the M-PDCP PDUs from lower layers in the MeNB. In addition, the PDCP layer may receive the S-PDCP PDUs from lower layers in the MeNB. The PDCP layer in the MeNB may treat the PDCP headers of the M-PDCP PDUs. In addition, the PDCP layer in the MeNB may treat the PDCP headers of the S-PDCP PDUs. The PDCP layer may combine the bearers and determine a COUNT. In other words, the M-PDCP PDUs and the S-PDCP PDUs may be combined into PDCP PDUs. The PDCP PDUs may be converted to PDCP SDUs. Deciphering may be applied to the PDCP SDUs. The PDCP layer may perform ROHC decompression and store the PDCP SDUs in a reordering buffer, wherein the reordering buffer assembles the PDCP SDUs in a correct order. The PDCP SDUs may be communicated in the uplink from the PDCP layer in the MeNB to higher layers in the MeNB, such as the IP layer or application layer.

Figure 3B:
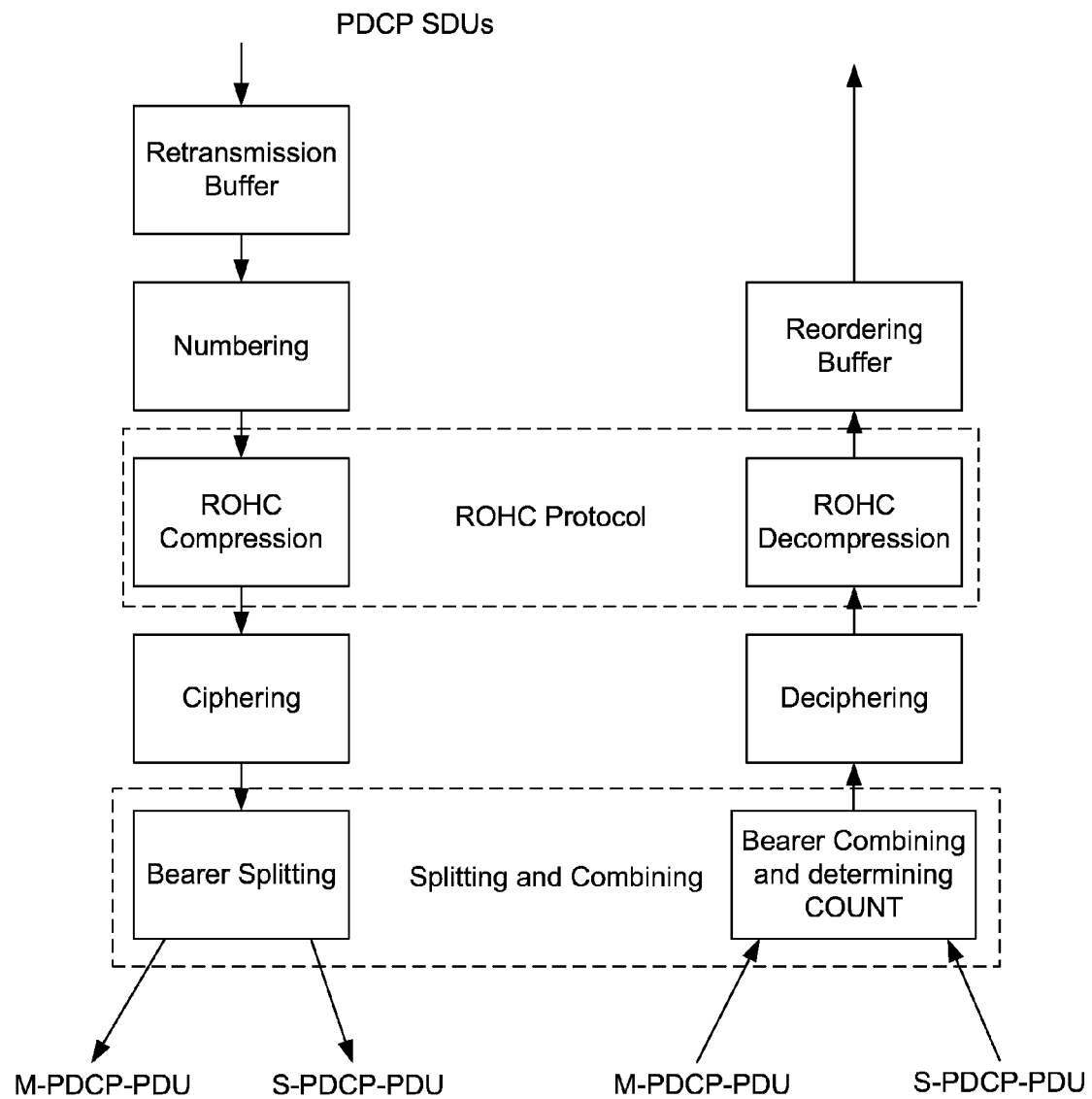
FIG. 3B illustrates a packet data convergence protocol (PDCP) layer in a user equipment (UE) in accordance with an example.

FIG. 3B illustrates a novel user plane packet data convergence protocol (PDCP) layer in a user equipment (UE). In the downlink, PDCP SDUs may be received at the PDCP layer in the UE from higher layers and stored at the retransmission buffer. A numbering function may be applied to the PDCP SDUs. The PDCP layer may perform header compression using a ROHC protocol, which can result in compressed PDCP SDUs. Ciphering may be applied to the compressed PDCP SDUs. In addition, the PDCP SDUs may be converted to PDCP PDUs. A bearer split may occur after the ciphering is performed. The bearer split may be performed based on an uplink split ratio, wherein the uplink split ratio is determined by the MeNB. The steps performed for calculating the uplink split ratio are described in further detail below. Based on the uplink split ratio, a first portion of the PDCP PDUs may become M-PDCP PDUs and a second portion of the PDCP PDUs may become S-PDCP PDUs. The UE may communicate the M-PDCP PDUs to a master evolved node B (MeNB) via a MeNB radio link. In addition, the UE may communicate the S-PDCP PDUs to a secondary evolved node B (SeNB) via a SeNB radio link.

In the uplink, the PDCP layer in the UE may receive the M-PDCP PDUs from lower layers in the UE. In addition, the PDCP layer in the UE may receive the S-PDCP PDUs from lower layers in the UE. The PDCP layer in the UE may combine the bearers and determine a COUNT. In other words, the M-PDCP PDUs and the S-PDCP PDUs may be combined into PDCP PDUs. The PDCP PDUs may be converted into PDCP SDUs. Deciphering may be applied to the PDCP SDUs. The PDCP layer may perform ROHC decompression and store the PDCP SDUs in a reordering buffer, wherein the reordering buffer assembles the PDCP SDUs in a correct order. In the uplink, the PDCP SDUs may be communicated from the PDCP layer in the UE to higher layers in the UE.

Figure 4:
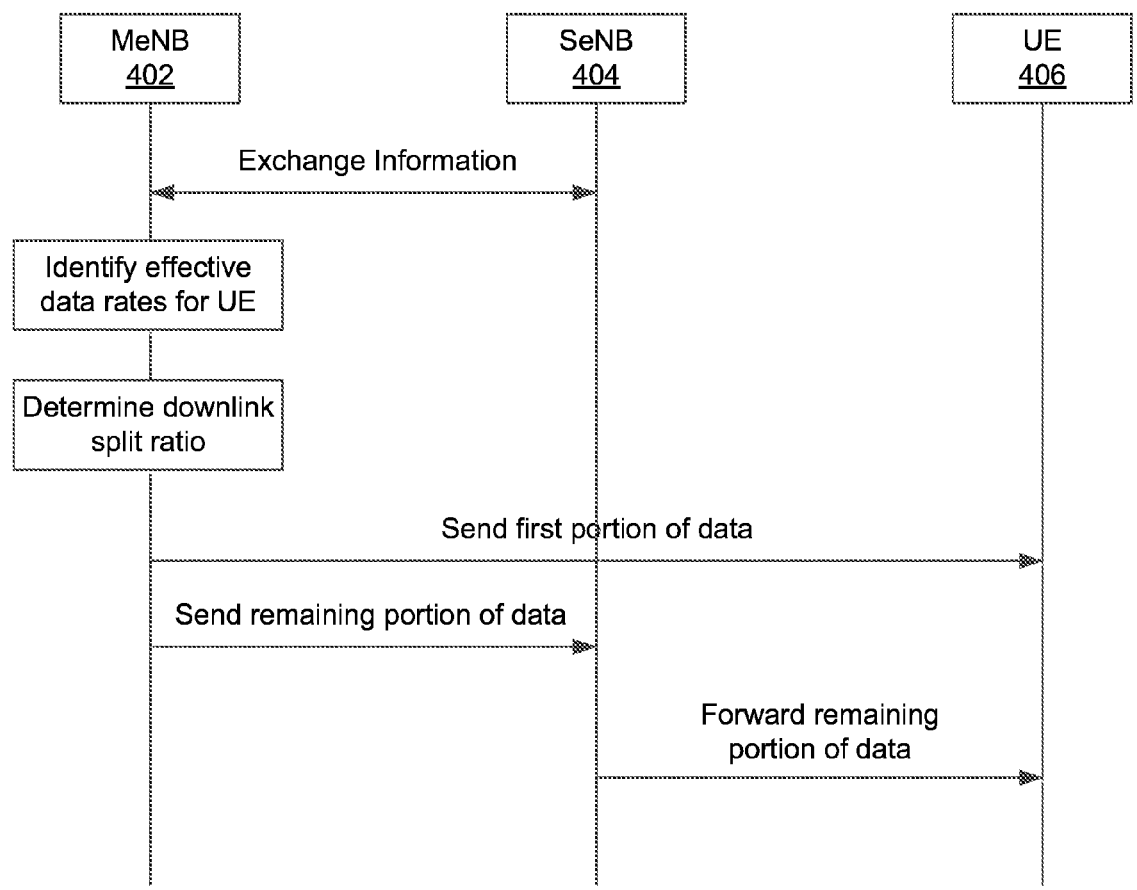
FIG. 4 illustrates signaling to determine a downlink split ratio at a master evolved node B (MeNB) and then send data to a user equipment (UE) according to the downlink split ratio in accordance with an example.

FIG. 4 illustrates signaling to determine a downlink split ratio at a master evolved node B (MeNB) 402, and then based on the downlink split ratio, the MeNB 402 may send data to a user equipment (UE) 406. The MeNB 402 and a second evolved node B (SeNB) 404 may exchange information for determining the downlink split ratio at the MeNB 402. In particular, a medium access channel (MAC) scheduler in the MeNB 402 may exchange the information with a MAC scheduler in the SeNB 402. In one example, the information may be exchanged between the MeNB 402 and the SeNB 404 using an X2 interface.

As an example, the information exchanged between the MeNB 402 and the SeNB 404 may describe an offered throughput to a user equipment (UE) 406, wherein the UE 406 is capable of dual connectivity (i.e., the UE 406 may receive data from both the MeNB 402 and the SeNB 404). The throughput may include a data rate for communicating data between the MeNB 402 and the UE 406, or a data rate for communicating data between the SeNB 404 and the UE 406. The data may be communicated between the MeNB 402 and the UE 406 over a MeNB radio link, and the data may be communicated between the SeNB 404 and the UE 406 over a SeNB radio link. In one example, the throughput may be determined using channel quality indicator (CQI) values for the UE 406. The CQI values for the UE 406 may indicate a suitable data rate (e.g., a modulation and coding scheme value) for downlink transmissions at the UE 406. The CQI values for the UE 406 may be based on signal to interference plus noise ratio (SINR) measurements at the UE 406. In one example, the UE 406 may report the CQI values to the MeNB 402, and the MeNB 402 may provide the CQI values to the SeNB 404. Alternatively, the UE 406 may report the CQI values to the SeNB 404, and the SeNB 404 may provide the CQI values to the MeNB 402.

The information exchanged between the MeNB 402 and the SeNB 404 may include a UE buffer status (e.g., whether a retransmission buffer in the UE 406 is not full or is about to overflow). The information exchanged between the MeNB 402 and the SeNB 404 may include a traffic type. The traffic type may be related to data that is to be communicated to the UE 406. For example, the UE 406 may receive delay-tolerant traffic (i.e., no time constraints) from the MeNB 402 and/or the SeNB 404. Alternatively, the UE 406 may receive delay-sensitive traffic, such as voice over internet protocol (VoIP) or video streaming, from the MeNB 402 and/or the SeNB 404. In addition, the information exchanged between the MeNB 402 and the SeNB 404 may include capacity and delay constraints of the X2 interface between the MeNB 402 and the SeNB 404, end-to-end latency between the MeNB 402 and the UE 406, acknowledgement (ACK)/negative acknowledgement (NACK) latency, scheduled internet protocol (IP) traffic, or a packet data convergence protocol (PDCP) buffer status at the UE 406.

The MeNB 402 may use the information exchanged with the SeNB 404 when determining the effective data rates for the UE 406. In other words, the MeNB 402 may determine an effective data rate for the MeNB radio link (i.e., the communication link between the MeNB 402 and the UE 406) and an effective data rate for the SeNB radio link (i.e., the communication link between the SeNB 404 and the UE 406). The effective data rate may define an average transfer rate of data over a period of time for the radio link (i.e., the MeNB radio link or the SeNB radio link).

In another example, the MeNB 402 may determine the effective data rates for the UE 406 using a Shannon capacity formula, i.e., $\log_2(1+SINR)$. The MeNB 402 may obtain two CQI values. The CQI values may be received from the SeNB 404 and/or the UE 406. The first CQI value may describe a channel quality of the MeNB radio link. The second CQI value may describe a channel quality of the SeNB radio link. The CQI values may be based on SINR measurements. Using the Shannon capacity formula and the SINR measurements from the CQI values, the MeNB 402 may determine a channel capacity for the MeNB radio link and a channel capacity for the SeNB radio link. The MeNB 402 may determine the effective data rates for the UE 406 based on the channel capacities of the MeNB radio link and the SeNB radio link, respectively.

As described in further detail below, the MeNB 402 may use the effective data rates for the UE 406 when determining the downlink split ratio. The downlink split ratio may define a percentage of data to be communicated to the UE 406 directly from the MeNB 402 and a percentage of data to be communicated to the UE 406 from the MeNB 402 via the SeNB 404. In one example, the PDCP layer of the MeNB 402 may determine the downlink split ratio for communicating data to the UE 406. The MeNB 402 may send a first portion of data to the UE 406 over the MeNB radio link. The MeNB 402 may send a remaining portion of data to the SeNB 404 over the X2 interface, and the SeNB 404 may forward the remaining portion of data to the UE 406 over the SeNB radio link. Thus, the UE 406 may support dual connectivity because the UE 406 may receive data from both the MeNB 402 and the SeNB 404.

As a non-limiting example, the PDCP layer in the MeNB 402 may receive IP traffic from higher layers (e.g., IP layer or application layer). Based on information exchanged with the SeNB 404, the MeNB 402 may determine the downlink split ratio for sending the data (i.e., the IP traffic received from the higher layers) to the UE 406. The MeNB 402 may send 25% of the data directly to the UE 406 over the MeNB radio link and 75% of the data to the UE 406 via the SeNB 404. In other words, the MeNB 402 may send 75% of the data to the SeNB 404 over the X2 interface, and the SeNB 404 may forward the data to the UE 406 over the SeNB radio link.

In one example, the MAC schedulers in the MeNB 402 and the SeNB 404 may use the offered throughput to the UE 406 from the MeNB 402 and the SeNB 404 when calculating a proportional fair (PF) metric to consider overall fairness issues. The MAC schedulers may decide a priority level and the effective data rates for the UE 406 for each scheduling instance. As another example, the MAC schedulers in the MeNB 402 and the SeNB 404 may share a percentage of resource blocks (RBs) used during each scheduling instance in order to achieve load balancing between the MeNB 402 and the SeNB 404. The load balancing between the MeNB 402 and the SeNB 404 may facilitate the communication of downlink or uplink traffic for the UE.

Figure 5:
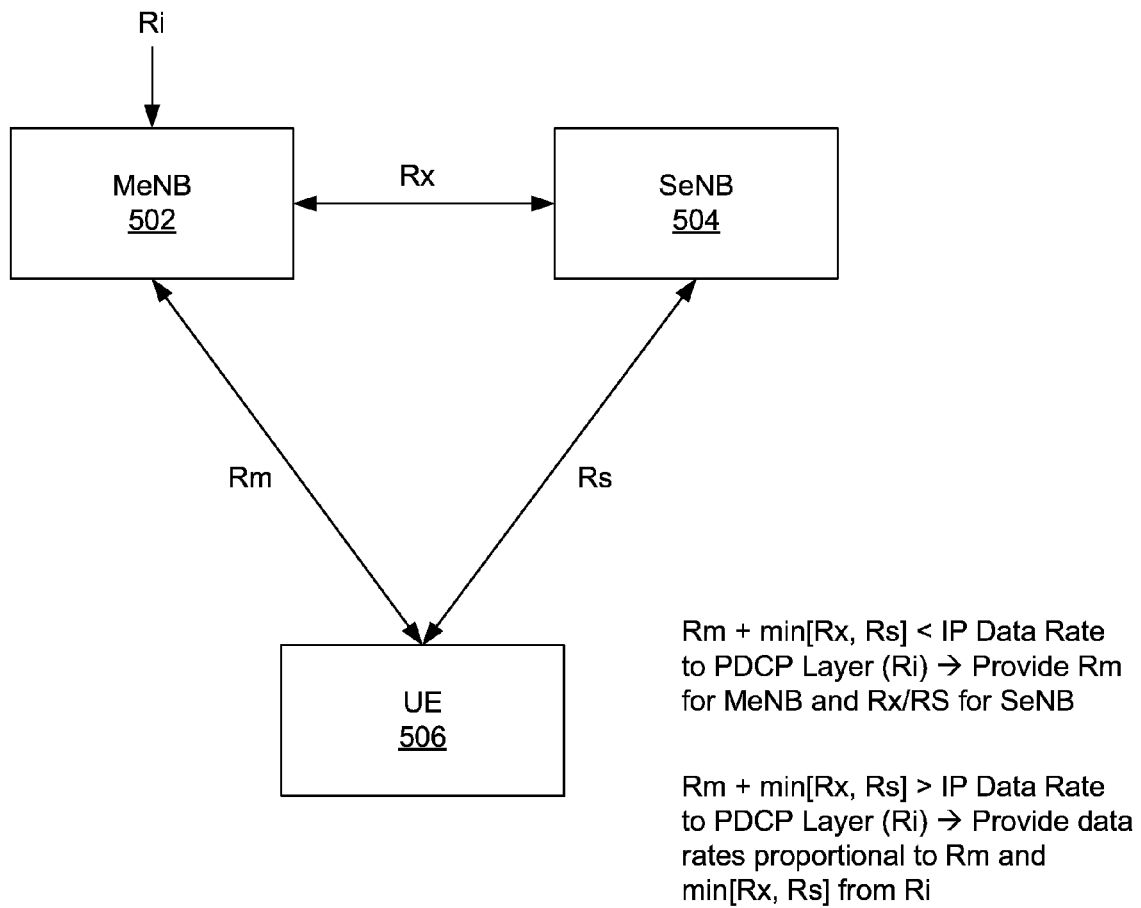
FIG. 5 is a diagram that illustrates calculating a downlink split ratio or an uplink split ratio for a dual connectivity system in accordance with an example.

FIG. 5 is a diagram that illustrates calculating a downlink split ratio or an uplink split ratio for a dual connectivity system. A PDCP layer in a master evolved node B (MeNB) 502 may receive Internet Protocol (IP) data traffic from higher layers (e.g., IP layer or application layer) in the MeNB 502. The MeNB 502 may communicate the data to a user equipment (UE) 506 either directly, or via a secondary evolved node B (SeNB) 504. The MeNB 502 may determine a percentage of data to be communicated to the UE 506 directly and a percentage of data to be communicated to the UE 506 via the SeNB 504 using a downlink split ratio. Thus, the UE 506 may support dual connectivity because the UE 506 may receive data from both the MeNB 502 and the SeNB 504.

The MeNB 502 may determine the downlink split ratio or the uplink split ratio using effective data rates for a MeNB radio link and a SeNB radio link. The MeNB radio link may be a communication link between the MeNB 502 and the UE 506. The SeNB radio link may be a communication link between the SeNB 504 and the UE 506. The effective data rates may be calculated using channel quality indicator (CQI) values, as described above. The effective data rate for the MeNB radio link may be represented as Rm and the effective data rate for the SeNB radio link may be represented as Rs. The MeNB 502 may communicate with the SeNB 504 over an X2 interface. A data capacity or data rate for the X2 interface may be represented as Rx. In addition, a date rate for IP traffic being provided to the PDCP layer in the MeNB 502 may be represented as Ri.

With regard to determining the downlink split ratio, if the effective data rate for the MeNB radio link (Rm) plus a minimum of the effective data rate for the SeNB radio link (Rs) and the data capacity for the X2 interface (Rx) is less than the date rate for IP traffic being provided to the PDCP layer in the MeNB 502 (Ri), then the MeNB 502 may provide the data to the UE 506 according to the effective data rate for the MeNB radio link (Rm). In other words, if Rm+min [Rs, Rx]<Ri, then the rate Rm may be offered according to the downlink split ratio. If the data capacity for the X2 interface (Rx) is greater than the effective data rate for the SeNB radio link (Rs), then the SeNB 504 may provide the data to the UE 506 according to the effective data rate for the SeNB radio link (Rs). In other words, if Rx>Rs, then the rate Rs may be offered according to the downlink split ratio. If the data capacity for the X2 interface (Rx) is less than the effective data rate for the SeNB radio link (Rs), then the SeNB 504 may provide the data to the UE 506 according to data capacity for the X2 interface (Rx). In other words, if Rs>Rx, then the rate Rx may be offered according to the downlink split ratio.

With regard to determining the downlink split ratio, if the effective data rate for the MeNB radio link (Rm) plus a minimum of the effective data rate for the SeNB radio link (Rs) and the data capacity for the X2 interface (Rx) is greater than the date rate for IP traffic being provided to the PDCP layer in the MeNB 502 (Ri), then the UE 504 may receive the data from the MeNB 502 and the SeNB 504 using data rates that are proportional to the effective data rate for the MeNB radio link (Rm) and a minimum of the effective data rate for the SeNB radio link (Rs) and the data capacity for the X2 interface (Rx) from the date rate for IP traffic being provided to the PDCP layer in the MeNB 502 (Ri). In other words, if Rm+min [Rs,Rx]>Ri, then the data rates for the UE 506 are offered in the downlink split ratio proportional to the Rm and the minimum of [Rs,Rx] from the rate Ri. In one example, if an end-to-end latency requirement is not satisfied for a particular UE, then a medium access channel (MAC) scheduler in the MeNB 502 may be notified to increase a priority level for that particular UE.

In one example, the effective data rate (Rm) for the MeNB link may be calculated or obtained from a MAC layer of the MeNB 502. The effective data rate (Rs) for the SeNB link may be calculated or obtained from a MAC layer in the SeNB 504. The Rx data rate (i.e., the capacity of the X2 link) may be obtained. The data rate Ri may be obtained from a TCP/IP layer. The minimum (min) value of (Rx, Rs) may be calculated. The data transmitted to the UE 506 over the MeNB link can be according to Ri*Rm/(Min(Rx,Rs)+Rm). In addition, the data transmitted to the UE 506 over the SeNB link can be according to Ri*Min(Rx,Rs)/(Min(Rx,Rs)+Rm).

As a non-limiting example, Ri is 800 bits/second, Rm is 600 bits/second, Rx is 300 bits/second and Rs is 400 bits/second. Since Rm+min [Rx, Rs]>Ri (i.e., 600 bits/s+ 300 bits/s>800 bits/s), then the UE 506 may receive the data according to data rates that are proportional to Rm (i.e., 600 bits/s) and a minimum of Rx and Rs (i.e., 300 bits/s) from Ri (i.e., 800 bits/s). As another non-limiting example, Ri is 1000 bits/second, Rm is 500 bits/second, Rx is 200 bits/second and Rs is 100 bits/second. Since Rm+min [Rx, Rs]<Ri (i.e., 300 bits/s+100 bits/s<1000 bits/s), then the UE 506 may receive the data according to the data rate Rm (i.e., 500 bits/s) and the data rate Rs (i.e., 100 bits/s) since Rx>Rs. In other words, since the rate Rx cannot be supported in the SeNB radio link, the rate Rs is offered when providing the data from the SeNB 504 to the UE 506.

With regard to determining the uplink split ratio, the UE 506 may send a bandwidth request to the MeNB 502 and the SeNB 504. In addition, the UE 506 may send a traffic type and a UE buffer status to the MeNB 502. The UE buffer status may describe whether a PDCP layer in the UE 506 is overflowing with IP traffic or about to overflow with IP traffic. Medium access channel (MAC) schedulers in the MeNB 502 and the SeNB 504 may exchange a throughput offered to the UE 506 (i.e., a throughput for both uplink and downlink), the UE buffer status, and a traffic type. The MeNB 502 and the SeNB 504 may exchange the information over an X2 interface. The MAC schedulers in the MeNB 502 and the SeNB 504 may calculate uplink grants for the UE 506. A PDCP layer in the MeNB 502 receives the uplink grant information and possible uplink rates for the UE 506. The PDCP layer in the MeNB 502 may calculate the uplink split ratio. As described earlier, if Rm+min [Rs, Rx]<Ri, then the rate Rm may be offered according to the uplink split ratio. If Rx>Rs, then the rate Rs may be offered according to the uplink split ratio, or if Rs>Rx, then the rate Rx may be offered according to the uplink split ratio. In addition, if Rm+min [Rs,Rx]>Ri, then the data rates for the UE 506 are offered proportional to the Rm and the minimum of [Rs,Rx] from the rate Ri. The PDCP layer in the MeNB 502 may send the uplink split ratio to a MAC scheduler in the UE 506. The PDCP layer in the UE 506 may use the uplink split ratio to split the data traffic for the two streams of data (i.e., a first stream of data may be communicated to the MeNB 502 and a second stream of data may be communicated to the SeNB 504).

In one example, the downlink and uplink split ratios may be calculated periodically (e.g., in the order of every few seconds to every few minutes) depending on network congestion, radio coverage, link condition, user mobility and/or loading of cells.

Figure 6:
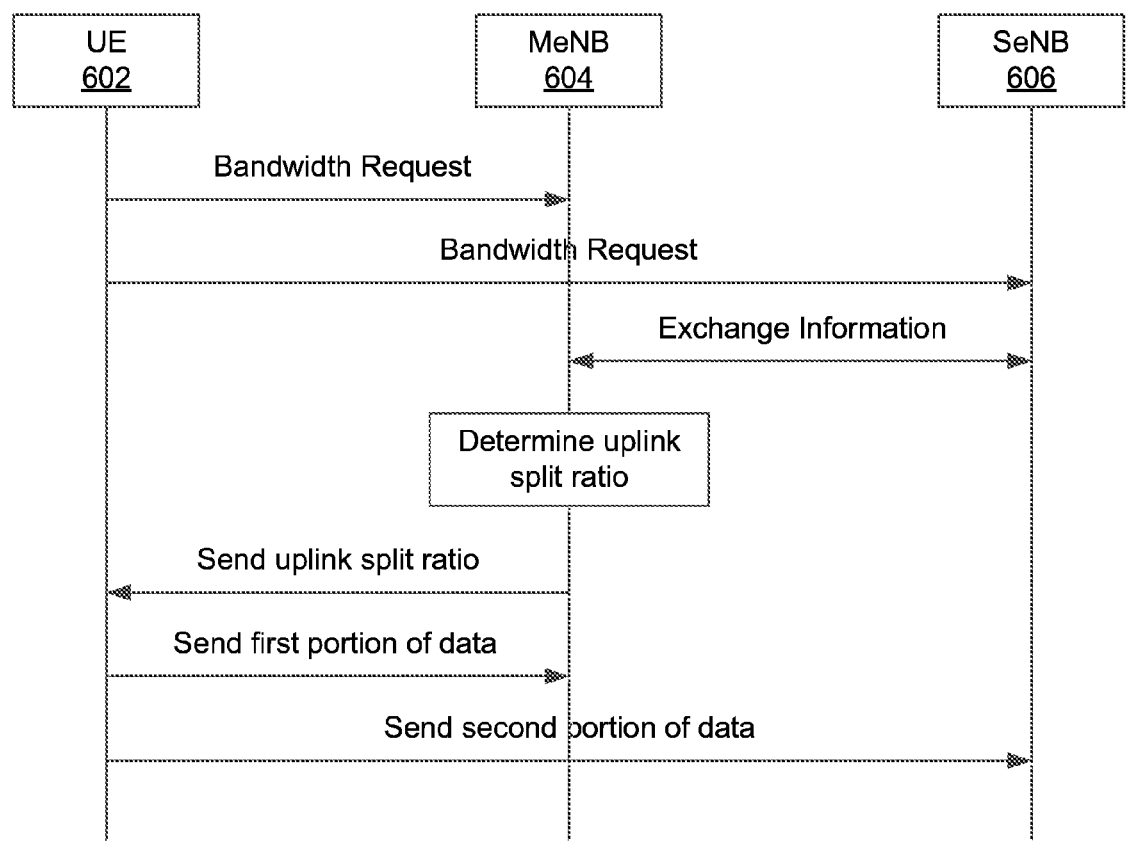
FIG. 6 illustrates signaling to determine an uplink split ratio at a master evolved node B (MeNB) and then provide the uplink split ratio to a user equipment (UE) in accordance with an example.

FIG. 6 illustrates signaling to determine an uplink split ratio at a master evolved node B (MeNB) 602 and then provide the uplink split ratio to a user equipment (UE) 606. The UE 602 may support dual connectivity with respect to the MeNB 604 and a secondary evolved node B (SeNB) 606. In other words, the UE 602 may receive data from both the MeNB 604 and the SeNB 606. The UE 602 may send a bandwidth request to the MeNB 604. In addition, the UE 602 may send the bandwidth request to the SeNB 606. The MeNB 604 and the SeNB 606 may exchange information over an X2 interface. For example, the MeNB 604 and the SeNB 606 may exchange a throughput offered to the UE 606, a UE buffer status, and a traffic type. The MeNB 604 may determine the uplink split ratio, as described earlier, using the information exchanged with the SeNB 606. The MeNB 604 may send the uplink split ratio to the UE 602. The UE 602 may send a first portion of data to the MeNB 604 using the uplink split ratio. In addition, the UE 602 may send a second portion of data to the SeNB 606 using the uplink split ratio. As a non-limiting example, the UE 602 may send 60% of the data to the MeNB 604 and the remaining 40% of the data to the SeNB 606 based on the uplink split ratio.

Figure 7:
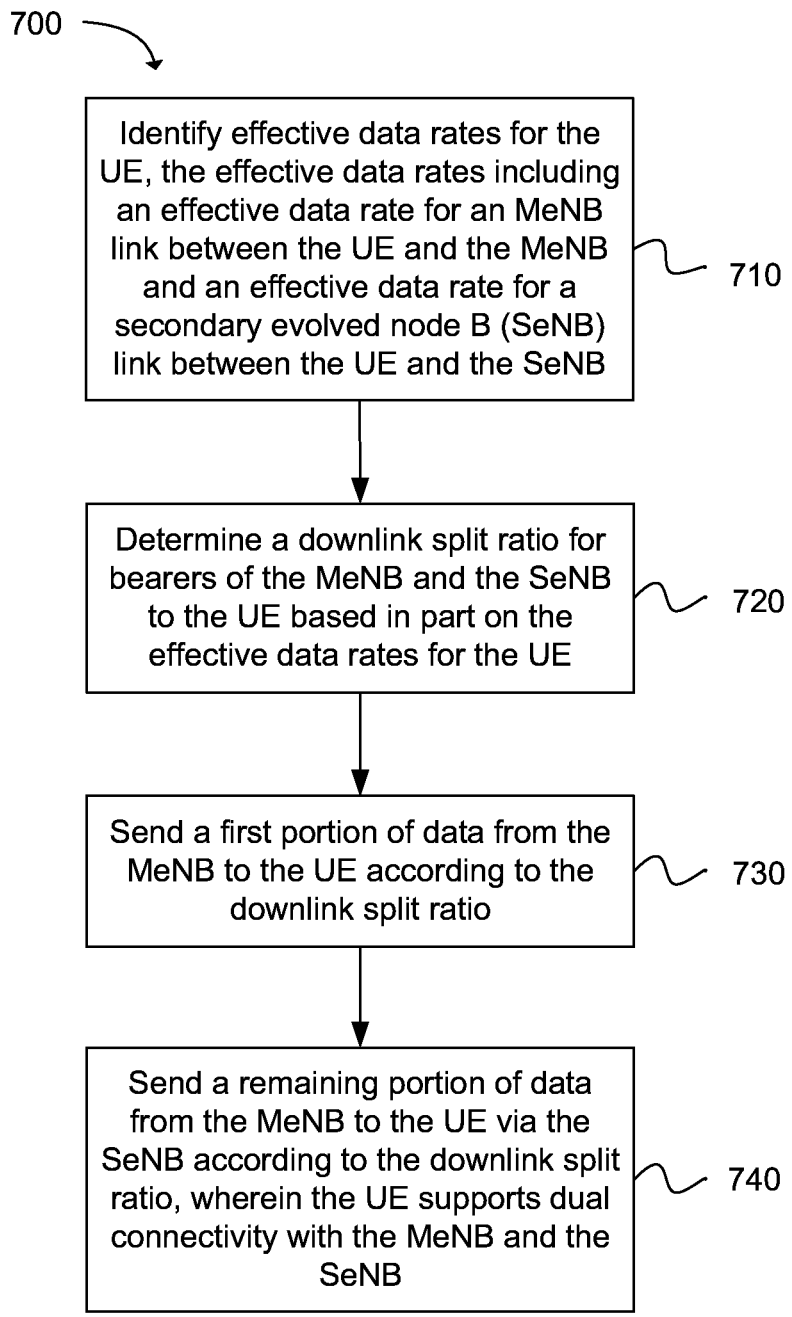
FIG. 7 depicts functionality of computer circuitry of a master evolved node B (MeNB) operable to communicate data to a user equipment (UE) in accordance with an example.

Another example provides functionality 700 of circuitry of a master evolved node B (MeNB) operable to communicate data to a user equipment (UE), as shown in the flow chart in FIG. 7. The functionality may be implemented as a method or the functionality may be executed as instructions on a machine, where the instructions are included on at least one computer readable medium or one non-transitory machine readable storage medium. The circuitry can be configured to identify effective data rates for the UE, the effective data rates including an effective data rate for an MeNB link between the UE and the MeNB and an effective data rate for a secondary evolved node B (SeNB) link between the UE and the SeNB, as in block 710. The circuitry can be configured to determine a downlink split ratio for bearers of the MeNB and the SeNB to the UE based in part on the effective data rates for the UE, as in block 720. The circuitry can be configured to send a first portion of data from the MeNB to the UE according to the downlink split ratio, as in block 730. In addition, the circuitry can be configured to send a remaining portion of data from the MeNB to the UE via the SeNB according to the downlink split ratio, wherein the UE supports dual connectivity with the MeNB and the SeNB, as in block 740.

In one configuration, the circuitry can be further configured to identify the effective data rates for the UE based on channel quality indicator (CQI) values received from at least one of the UE or the SeNB, the CQI values including a first CQI value indicating a channel quality for the MeNB link and a second CQI value indicating a channel quality for the SeNB link. In another configuration, the circuitry can be further configured to identify the effective data rates for the UE by exchanging information with the SeNB, the information including at least one of: the effective data rate for the SeNB link, a packet size or transport block size on the SeNB link, a type of traffic, a capacity of an interface between the MeNB and the SeNB, delay constraints for the interface between the MeNB and the SeNB, end-to-end latency between the MeNB and the UE, acknowledgement (ACK)/negative acknowledgement (NACK) latency, scheduled internet protocol (IP) traffic, or a packet data convergence protocol (PDCP) buffer status at the UE.

In one example, the circuitry can be further configured to exchange the information with the SeNB via an X2 interface. In another example, the circuitry can be further configured to calculate a proportional fair (PF) metric using a total offered throughput from the MeNB and the SeNB to the UE. In yet another example, the circuitry can be further configured to: send a first percentage of packet data unit (PDU) packets from the MeNB directly to the UE according to the downlink split ratio; and send a second percentage of PDU packets from the MeNB to the UE via the SeNB according to the downlink split ratio.

In one configuration, the circuitry can be further configured to semi statically or dynamically share resource blocks (RBs) between the MeNB and the SeNB for downlink (DL) or uplink (UL) traffic for the UE in order to achieve load balancing between the MeNB and the SeNB. In another configuration, the circuitry can be further configured to determine the downlink split ratio at a packet data convergence protocol (PDCP) layer in the MeNB. In yet another configuration, the circuitry can be further configured to: determine that the effective data rate for the MeNB link (Rm) plus one of the effective data rate for the SeNB link (Rs) or a data capacity of an X2 link between the MeNB and the SeNB (Rx) is less than an internet protocol (IP) data rate to the packet data convergence protocol (PDCP) layer in the MeNB (Ri); and determine the downlink split ratio to include the effective data rate for the MeNB link (Rm), wherein data is transmitted from the MeNB to the UE over the MeNB link according to the downlink split ratio.

In one example, the circuitry can be further configured to: determine the downlink split ratio to include the total effective rate for the SeNB link (Rs) when the data capacity of the X2 link between the MeNB and the SeNB (Rx) is greater than the effective data rate for the SeNB link (Rs); or determine the downlink split ratio to include the data capacity of the X2 link (Rx) when Rx is less than the effective data rate for the SeNB link (Rs); and transmit the data to the UE over the SeNB link according to the downlink split ratio. In another example, the circuitry can be further configured to: determine that the effective data rate for the MeNB link (Rm) plus one of the effective data rate for the SeNB link (Rs) or a data capacity of an X2 link between the MeNB and the SeNB (Rx) is greater than an internet protocol (IP) data rate to the packet data convergence protocol (PDCP) layer in the MeNB (Ri); and determine the downlink split ratio to include a data rate proportional to the effective data rate for the MeNB link (Rm) and one of the effective data rate for the SeNB link (Rs) or a data capacity of an X2 link between the MeNB and the SeNB (Rx) from the IP data rate to the PDCP layer in the MeNB (Ri).

In one configuration, the circuitry can be further configured to: calculate the effective data rate for the MeNB link (Rm); calculate the effective data rate for the SeNB link (Rs); determine a data capacity of an X2 link between the MeNB and the SeNB (Rx); determine an internet protocol (IP) data rate to the packet data convergence protocol (PDCP) layer in the MeNB (Ri); calculate a minimum (min) value of (Rx, Rs); and transmit data over the MeNB link according to $Ri*Rm/(Min(Rx,Rs)+Rm)$; or transmit the data over the SeNB link according to $Ri*Min(Rx,Rs)/(Min(Rx,Rs)+Rm)$. In another configuration, the circuitry can be further configured to: receive a notification at the MeNB when an end-to-end latency threshold is not met for the UE; and increase a priority level for sending the data to the UE when the end-to-end latency threshold is not met for the UE.

In one example, the circuitry can be further configured to determine the downlink split ratio when the end-to-end latency threshold is not met for the UE in order to readjust the end-to-end latency. In another example, the circuitry can be further configured to periodically determine the downlink split ratio depending on network congestion, radio coverage, link condition, user mobility, or loading of cells.

Figure 8:
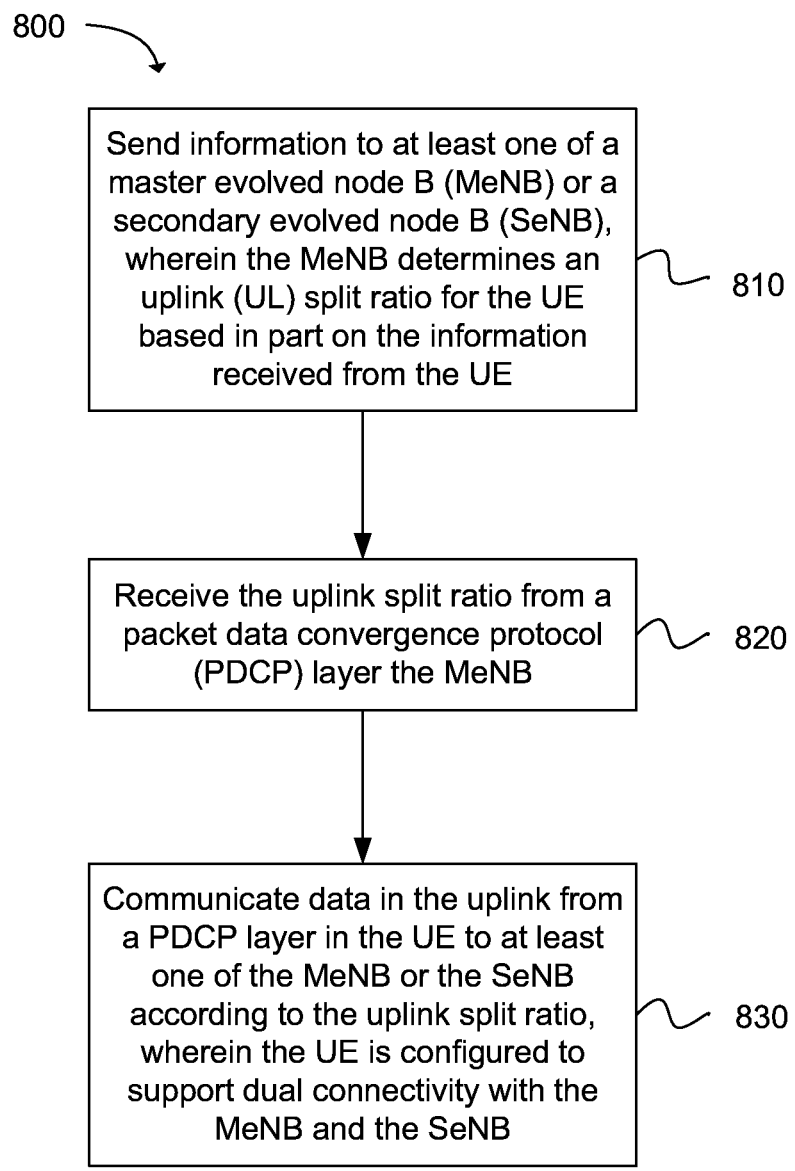
FIG. 8 depicts functionality of computer circuitry of a user equipment (UE) that is configured for dual connectivity in accordance with an example.

Another example provides functionality 800 of circuitry of a user equipment (UE) configured to support dual connectivity, as shown in the flow chart in FIG. 8. The functionality may be implemented as a method or the functionality may be executed as instructions on a machine, where the instructions are included on at least one computer readable medium or one non-transitory machine readable storage medium. The circuitry can be configured to send information to at least one of a master evolved node B (MeNB) or a secondary evolved node B (SeNB), wherein the MeNB determines an uplink (UL) split ratio for the UE based in part on the information received from the UE, as in block 810. The circuitry can be configured to receive the uplink split ratio from a packet data convergence protocol (PDCP) layer the MeNB, as in block 820. In addition, the circuitry can be configured to communicate data in the uplink from a PDCP layer in the UE to at least one of the MeNB or the SeNB according to the uplink split ratio, wherein the UE is configured to support dual connectivity with the MeNB and the SeNB, as in block 830.

In one example, the circuitry can be further configured to send the information to the MeNB or the SeNB that includes at least one of: a bandwidth request, traffic type information, or packet data convergence protocol (PDCP) buffer status information for the UE. In another example, the circuitry can be further configured to: send a first portion of data from the UE to the MeNB according to the uplink split ratio; and send a remaining portion of data from the UE to the SeNB according to the uplink split ratio. In yet another example, the UE includes an antenna, a touch sensitive display screen, a speaker, a microphone, a graphics processor, an application processor, an internal memory, or a non-volatile memory port.

Figure 9:
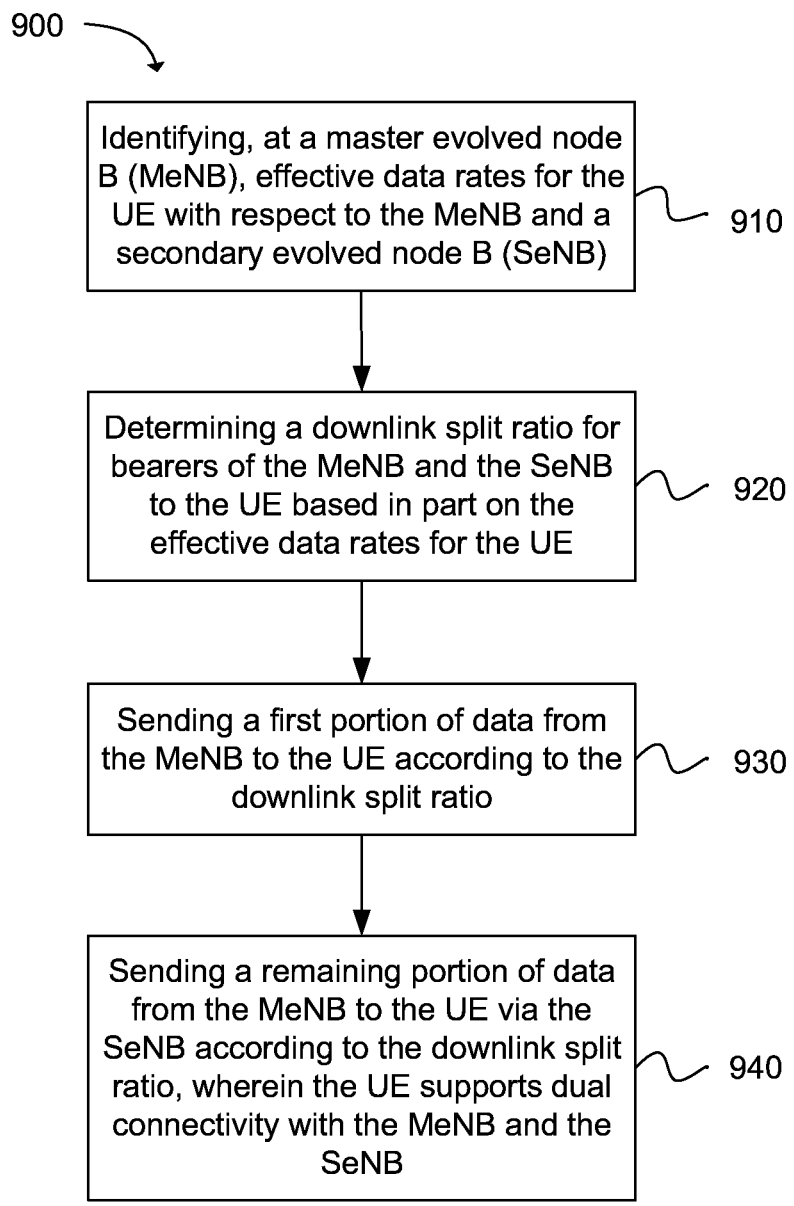
FIG. 9 depicts a flowchart of a method for communicating data to a user equipment (UE) in accordance with an example.

Another example provides a method 900 for communicating data to a user equipment (UE), as shown in the flow chart in FIG. 9. The method may be executed as instructions on a machine, where the instructions are included on at least one computer readable medium or one non-transitory machine readable storage medium. The method can include the operation of identifying, at a master evolved node B (MeNB), effective data rates for the UE with respect to the MeNB and a secondary evolved node B (SeNB), as in block 910. The method can include the operation of determining a downlink split ratio for bearers of the MeNB and the SeNB to the UE based in part on the effective data rates for the UE, as in block 920. The method can include the operation of sending a first portion of data from the MeNB to the UE according to the downlink split ratio, as in block 930. In addition, the method can include the operation of sending a remaining portion of data from the MeNB to the UE via the SeNB according to the downlink split ratio, wherein the UE supports dual connectivity with the MeNB and the SeNB, as in block 940.

In one example, the effective data rates include an effective data rate for an MeNB link between the UE and the MeNB and an effective data rate for an SeNB link between the UE and the SeNB. In another example, the method can include the operation of identifying the effective data rates for the UE based on channel quality indicator (CQI) values received from at least one of the UE or the SeNB, the CQI values including a first CQI value indicating a channel quality for the MeNB link and a second CQI value indicating a channel quality for the SeNB link.

In one configuration, the method can include the operation of identifying the effective data rates for the UE by exchanging information with the SeNB, the information including at least one of: the effective data rate for the SeNB link, a type of traffic, a capacity of an interface between the MeNB and the SeNB, delay constraints for the interface between the MeNB and the SeNB, end-to-end latency between the MeNB and the UE, acknowledgement (ACK)/negative acknowledgement (NACK) latency, scheduled internet protocol (IP) traffic, or a packet data convergence protocol (PDCP) buffer status at the UE. In addition, the method can include the operation of exchanging the information with the SeNB via an X2 interface.

Figure 10:
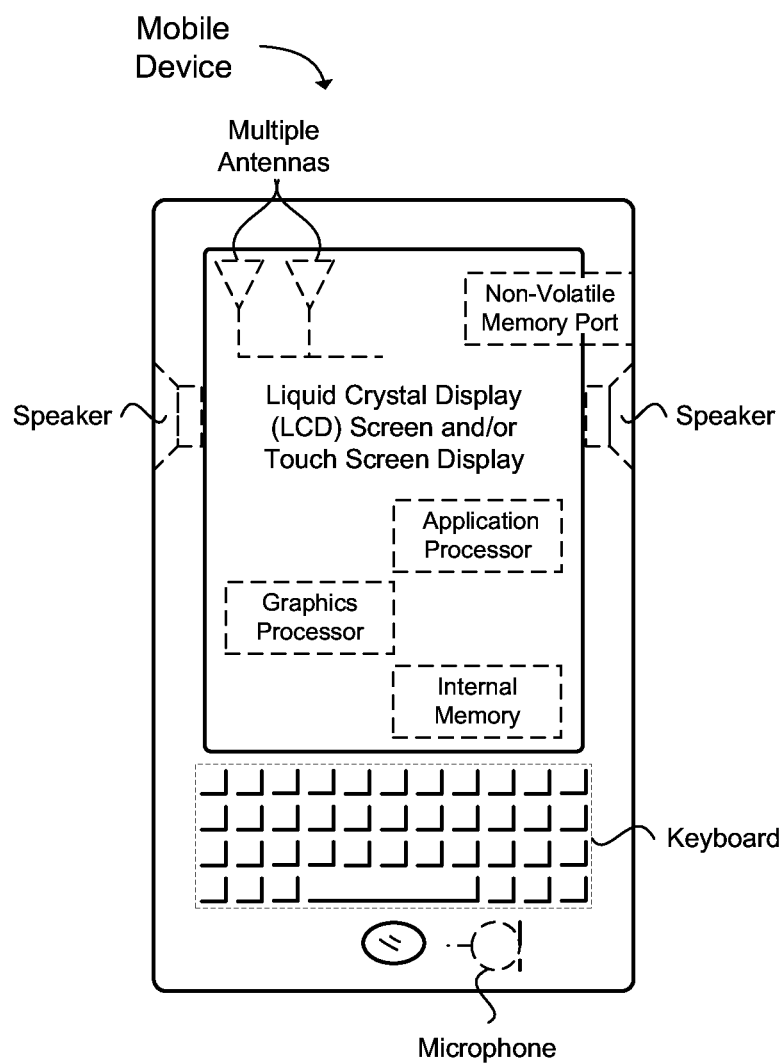
FIG. 10 illustrates a diagram of a wireless device (e.g., UE) in accordance with an example.

FIG. 10 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. In one example, a master evolved node B (MeNB) can be configured for LTE and a secondary evolved node B (SeNB) can be configured for WiFi, LTE or WiMAX. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A master evolved node B (MeNB) operable to communicate data to a user equipment (UE), the MeNB comprising:
    one or more processors; and
    a memory device including instructions that, when executed by the one or more processors, cause the one or more processors to;
    identify effective data rates for the UE, the effective data rates including an effective data rate for an MeNB link between the UE and the MeNB and an effective data rate for a secondary evolved node B (SeNB) link between the UE and the SeNB;
    determine a downlink split ratio for bearers of the MeNB and the SeNB to the UE based in part on the effective data rates for the UE;
    send a first portion of data from the MeNB to the UE according to the downlink split ratio;
    send a remaining portion of data from the MeNB to the UE via the SeNB according to the downlink split ratio, wherein the UE supports dual connectivity with the MeNB and the SeNB;
    determine that the effective data rate for the MeNB link (Rm) plus one of the effective data rate for the SeNB link (Rs) or a data capacity of an X2 link between the MeNB and the SeNB (Rx) is less than an internet protocol (IP) data rate to the packet data convergence protocol (PDCP) layer in the MeNB (Ri); and
    determine the downlink split ratio to include the effective data rate for the MeNB link (Rm), wherein data is transmitted from the MeNB to the UE over the MeNB link according to the downlink split ratio.

2. The MeNB of claim 1, wherein the instructions, when executed by the one or more processors, further cause the one or more processors to identify the effective data rates for the UE based on channel quality indicator (CQI) values received from at least one of the UE or the SeNB, the CQI values including a first CQI value indicating a channel quality for the MeNB link and a second CQI value indicating a channel quality for the SeNB link.

3. The MeNB of claim 1, wherein the instructions, when executed by the one or more processors, further cause the one or more processors to identify the effective data rates for the UE by exchanging information with the SeNB, the information including at least one of: the effective data rate for the SeNB link, a packet size or transport block size on the SeNB link, a type of traffic, a capacity of an interface between the MeNB and the SeNB, delay constraints for the interface between the MeNB and the SeNB, end-to-end latency between the MeNB and the UE, acknowledgement (ACK)/negative acknowledgement (NACK) latency, scheduled internet protocol (IP) traffic, or a packet data convergence protocol (PDCP) buffer status at the UE.

4. The MeNB of claim 3, wherein the instructions, when executed by the one or more processors, further cause the one or more processors to exchange the information with the SeNB via an X2 interface.

5. The MeNB of claim 1, wherein the instructions, when executed by the one or more processors, further cause the one or more processors to calculate a proportional fair (PF) metric using a total offered throughput from the MeNB and the SeNB to the UE to achieve load balancing between the MeNB and the SeNB.

6. The MeNB of claim 1, wherein the instructions, when executed by the one or more processors, further cause the one or more processors to:
send a first percentage of packet data unit (PDU) packets from the MeNB directly to the UE according to the downlink split ratio; and
send a second percentage of PDU packets from the MeNB to the UE via the SeNB according to the downlink split ratio.

7. The MeNB of claim 1, wherein the instructions, when executed by the one or more processors, further cause the one or more processors to semi statically or dynamically share resource blocks (RBs) between the MeNB and the SeNB for downlink (DL) or uplink (UL) traffic for the UE in order to achieve load balancing between the MeNB and the SeNB.

8. The MeNB of claim 1, wherein the instructions, when executed by the one or more processors, further cause the one or more processors to determine the downlink split ratio at a packet data convergence protocol (PDCP) layer in the MeNB.

9. The MeNB of claim 1, wherein the instructions, when executed by the one or more processors, further cause the one or more processors to:
determine the downlink split ratio to include the total effective rate for the SeNB link (Rs) when the data capacity of the X2 link between the MeNB and the SeNB (Rx) is greater than the effective data rate for the SeNB link (Rs); or
determine the downlink split ratio to include the data capacity of the X2 link (Rx) when Rx is less than the effective data rate for the SeNB link (Rs); and
transmit the data to the UE over the SeNB link according to the downlink split ratio.

10. The MeNB of claim 1, wherein the instructions, when executed by the one or more processors, further cause the one or more processors to:
determine that the effective data rate for the MeNB link (Rm) plus one of the effective data rate for the SeNB link (Rs) or a data capacity of an X2 link between the MeNB and the SeNB (Rx) is greater than an internet protocol (IP) data rate to the packet data convergence protocol (PDCP) layer in the MeNB (Ri); and
determine the downlink split ratio to include a data rate proportional to the effective data rate for the MeNB link (Rm) and one of the effective data rate for the SeNB link (Rs) or a data capacity of an X2 link between the MeNB and the SeNB (Rx) from the IP data rate to the PDCP layer in the MeNB (Ri).

11. The MeNB of claim 1, wherein the instructions, when executed by the one or more processors, further cause the one or more processors to:
calculate the effective data rate for the MeNB link (Rm);
calculate the effective data rate for the SeNB link (Rs);
determine a data capacity of an X2 link between the MeNB and the SeNB (Rx);
determine an internet protocol (IP) data rate to the packet data; convergence protocol (PDCP) layer in the MeNB (Ri);
calculate a minimum (min) value of (Rx, Rs); and
transmit data over the MeNB link according to Ri*Rm/(Min(Rx,Rs)+Rm); or
transmit the data over the SeNB link according to Ri*Min(Rx,Rs)/(Min(Rx,Rs)+Rm).

12. The MeNB of claim 1, wherein the instructions, when executed by the one or more processors, further cause the one or more processors to:
receive a notification at the MeNB when an end-to-end latency threshold is not met for the UE; and
increase a priority level for sending the data to the UE when the end-to-end latency threshold is not met for the UE.

13. The MeNB of claim 1, wherein the instructions, when executed by the one or more processors, further cause the one or more processors to determine the downlink split ratio when an end-to-end latency threshold is not met for the UE in order to readjust the end-to-end latency.

14. The MeNB of claim 1, wherein the instructions, when executed by the one or more processors, further cause the one or more processors to periodically determine the downlink split ratio depending on network congestion, radio coverage, link condition, user mobility, or loading of cells.

15. A user equipment (UE) that is configured to support dual connectivity, the UE comprising:
one or more processors; and
a memory device including instructions that, when executed by the one or more processors, cause the one or more processors to;
send information to at least one of a master evolved node B (MeNB) or a secondary evolved node B (SeNB), wherein the MeNB determines an uplink (UL) split ratio for the UE based in part on the information received from the UE;
receive the uplink split ratio from a packet data convergence protocol (PDCP) layer of the MeNB;
communicate data in the uplink from a PDCP layer in the UE to at least one of the MeNB or the SeNB according to the uplink split ratio, wherein the UE is configured to support dual connectivity with the MeNB and the SeNB;
send information to at least one of the MeNB or the SeNB, wherein the MeNB determines that the effective data rate for the MeNB link (Rm) plus one of the effective data rate for the SeNB link (Rs) or a data capacity of an X2 link between the MeNB and the SeNB (Rx) is less than an internet protocol (IP) data rate to the packet data convergence protocol (PDCP) layer in the MeNB (Ri); and
send information to at least one of the MeNB or the SeNB, wherein the MeNB determines the downlink split ratio to include the effective data rate for the MeNB link (Rm), wherein data is transmitted from the MeNB to the UE over the MeNB link according to the downlink split ratio.

16. The UE of claim 15, wherein the instructions, when executed by the one or more processors, further cause the one or more processors to send the information to the MeNB or the SeNB that includes at least one of: a bandwidth request, traffic type information, or packet data convergence protocol (PDCP) buffer status information for the UE.

17. The UE of claim 15, wherein the instructions, when executed by the one or more processors, further cause the one or more processors to:
send a first portion of data from the UE to the MeNB according to the uplink split ratio; and
send a remaining portion of data from the UE to the SeNB according to the uplink split ratio.

18. The UE of claim 16, wherein the UE includes an antenna, a touch sensitive display screen, a speaker, a microphone, a graphics processor, an application processor, an internal memory, or a non-volatile memory port.

19. A method for communicating data to a user equipment (UE), the method comprising:
identifying, at a master evolved node B (MeNB), effective data rates for the UE with respect to the MeNB and a secondary evolved node B (SeNB);
determining a downlink split ratio for bearers of the MeNB and the SeNB to the UE based in part on the effective data rates for the UE;
sending a first portion of data from the MeNB to the UE according to the downlink split ratio;
sending a remaining portion of data from the MeNB to the UE via the SeNB according to the downlink split ratio, wherein the UE supports dual connectivity with the MeNB and the SeNB;
determining that the effective data rate for the MeNB link (Rm) plus one of the effective data rate for the SeNB link (Rs) or a data capacity of an X2 link between the MeNB and the SeNB (Rx) is less than an internet protocol (IP) data rate to the packet data convergence protocol (PDCP) layer in the MeNB (Ri); and
determining the downlink split ratio to include the effective data rate for the MeNB link (Rm), wherein data is transmitted from the MeNB to the UE over the MeNB link according to the downlink split ratio.

20. The method of claim 19, wherein the effective data rates include an effective data rate for an MeNB link between the UE and the MeNB and an effective data rate for an SeNB link between the UE and the SeNB.

21. The method of claim 19, further comprising identifying the effective data rates for the UE based on channel quality indicator (CQI) values received from at least one of the UE or the SeNB, the CQI values including a first CQI value indicating a channel quality for the MeNB link and a second CQI value indicating a channel quality for the SeNB link.

22. The method of claim 19, further comprising identifying the effective data rates for the UE by exchanging information with the SeNB, the information including at least one of: the effective data rate for the SeNB link, a type of traffic, a capacity of an interface between the MeNB and the SeNB, delay constraints for the interface between the MeNB and the SeNB, end-to-end latency between the MeNB and the UE, acknowledgement (ACK)/negative acknowledgement (NACK) latency, scheduled internet protocol (IP) traffic, or a packet data convergence protocol (PDCP) buffer status at the UE.

23. The method of claim 22, further comprising exchanging the information with the SeNB via an X2 interface.

24. The method of claim 19, further comprising:
determining the downlink split ratio to include the total effective rate for the SeNB link (Rs) when the data capacity of the X2 link between the MeNB and the SeNB (Rx) is greater than the effective data rate for the SeNB link (Rs); or
determining the downlink split ratio to include the data capacity of the X2 link (Rx) when Rx is less than the effective data rate for the SeNB link (Rs); and
transmitting the data to the UE over the SeNB link according to the downlink split ratio.

25. The method of claim 19, further comprising:
determining that the effective data rate for the MeNB link (Rm) plus one of the effective data rate for the SeNB link (Rs) or a data capacity of an X2 link between the MeNB and the SeNB (Rx) is greater than an internet protocol (IP) data rate to the packet data convergence protocol (PDCP) layer in the MeNB (Ri); and
determining the downlink split ratio to include a data rate proportional to the effective data rate for the MeNB link (Rm) and one of the effective data rate for the SeNB link (Rs) or a data capacity of an X2 link between the MeNB and the SeNB (Rx) from the IP data rate to the PDCP layer in the MeNB (Ri).

26. The method of claim 19, further comprising:
calculating the effective data rate for the MeNB link (Rm);
calculating the effective data rate for the SeNB link (Rs);
determining a data capacity of an X2 link between the MeNB and the SeNB (Rx);
determining an internet protocol (IP) data rate to the packet data;
convergence protocol (PDCP) layer in the MeNB (Ri);
calculating a minimum (min) value of (Rx, Rs); and
transmitting data over the MeNB link according to Ri*Rm/(Min(Rx,Rs)+Rm); or
transmitting the data over the SeNB link according to Ri*Min(Rx,Rs)/(Min(Rx,Rs)+Rm).

27. At least one non-transitory machine readable storage medium comprising a plurality of instructions adapted to be executed to implement the method of claim 19.

* * * * *